INVENTOR.
DAVID G. CLUTE
BY Wade Koontz
ATTORNEY
and
H. W. Losche
AGENT

Jan. 11, 1955 D. G. CLUTE 2,699,301

RADIO CONTROL SYSTEM FOR PROPORTIONAL PILOTING OF GUIDED VEHICLES

Filed Sept. 25, 1947 3 Sheets-Sheet 2

INVENTOR.
DAVID G. CLUTE
BY Wade Koontz
ATTORNEY and
H. H. Losch
AGENT

Jan. 11, 1955 D. G. CLUTE 2,699,301

RADIO CONTROL SYSTEM FOR PROPORTIONAL PILOTING OF GUIDED VEHICLES

Filed Sept. 25, 1947 3 Sheets-Sheet 3

INVENTOR.
DAVID G. CLUTE
BY Wade Koontz
ATTORNEY and
H. H. Losche
AGENT

United States Patent Office 2,699,301

Patented Jan. 11, 1955

2,699,301

RADIO CONTROL SYSTEM FOR PROPORTIONAL PILOTING OF GUIDED VEHICLES

David G. Clute, Dayton, Ohio

Application September 25, 1947, Serial No. 776,045

6 Claims. (Cl. 244—77)

(Granted under Title 35, U. S. Code (1952), sec. 266)

The invention described herein may be manufactured and used by or for the Government for governmental purposes without payment to me of any royalty thereon.

This invention relates to radio control systems for remote proportional piloting of guided missiles, or the like, or more particularly to the utilization of phase difference of the modulation in radio frequency carriers to transmit proportional control information in amount depending on phase angle to the controlled vehicle.

Considerable research is being pursued in radio control systems for remotely controlling mobile vehicles, principally for aircraft and ships. While many such radio control systems have been devised, a great many disadvantages have been generally recognized. In the radio control system used most extensively, the information signal is transmitted in pulses but the information signal received by the receiver in the remotely controlled mobile vehicle is often distorted by attenuation, reflection, or absorption by the radio frequency carrying the information. Control information transmitted in this manner requires considerable mental calculation to apply the signal for the proper time period to produce the desirable amount of control to the remote vehicle being controlled. These calculations, even when made by an experienced operator, are subject to considerable error and actually amount to no more than mere guesses by inexperienced operators. Also, radio frequency interference or static, or a direct jamming signal will affect the operation of the control system.

In accordance with the present invention, the phase difference between two synchronized audio frequency signals modulating two adjacent radio frequency carriers is used to transmit proportional control information to a controlled mobile vehicle. The phase difference will not vary by attenuation of either radio frequency carrier which the audio frequency signals are modulating and the magnitude of phase change caused by multiple path radio frequency transmission at the audio frequency used is not large enough to affect the operation of the system. The control information is detected by a circuit having thyratrons therein that are so connected to trigger controlling circuits for guiding the mobile vehicle upon any phase change between the synchronized audio frequency signals. It is preferable to use thyratrons since these tubes are mechanically stable and, as used in conjunction with alternating voltages, any thermal deviations are negligible to the operation of the system. Moreover, considerable change in amplitude of the alternating voltages firing the thyratrons can be tolerated without affecting the operation of the system. Further, the operator of the system of this information does not need to mentally convert the needed amount of deflection of the remote control component into an amount of time in which the signal must be held as for the present widely used "on-off" system of remote control since the system of the present invention will transmit how much "on" or "off" control is required by the initial phase setting. Radio frequency interference or static or a small amount of jamming signal will not be effective to change the transmitted control information.

It is a primary object of this invention to remotely control a mobile vehicle by radiant energy in which the use of phase difference of the modulation on a radio frequency carrier by audio frequencies produces the control information.

It is another object of this invention to control the phase difference of modulation on one or more radio frequency carriers which phase difference is detected by thyratrons and transferred into one or more control information signals.

It is a further object of this invention to provide a radiant energy transmission system to remotely control a mobile vehicle by producing control information in phase difference of the modulation on radio frequency carriers at the control point and detect these phase differences in the receiver of the mobile vehicles by thyratrons which control information is transformed into mechanical energy to control the mobile vehicle.

Other objects and advantages will become more apparent as the description proceeds and taken along with the accompanying drawings, in which.

Figures 1, 4, 5:
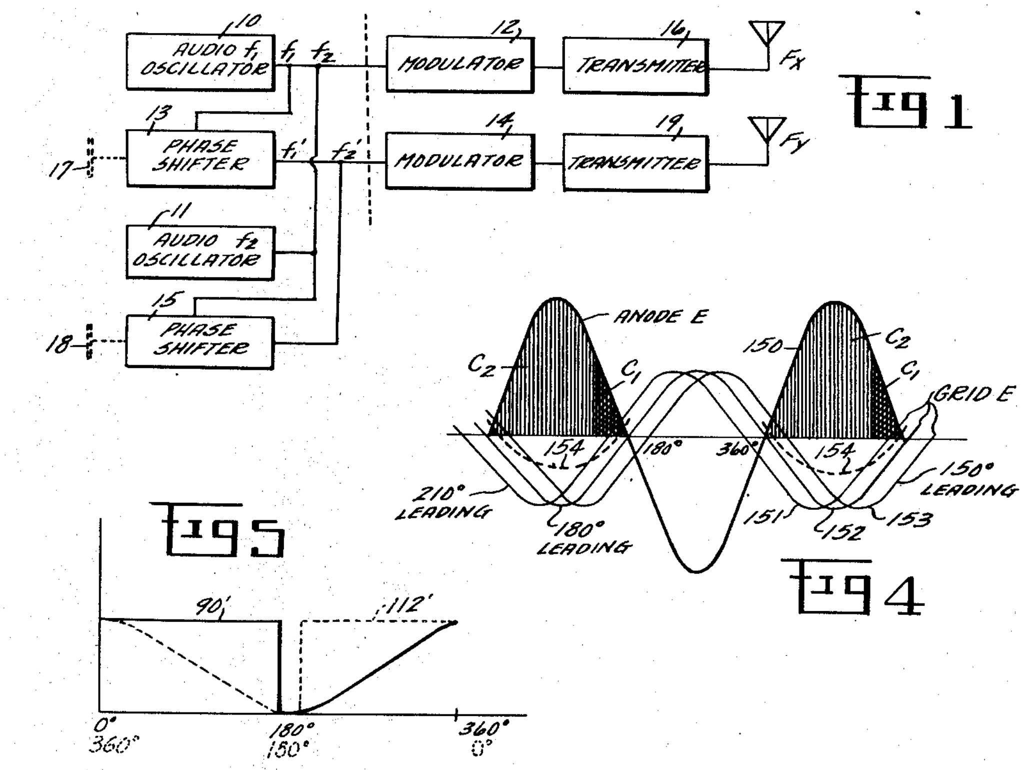
Fig. 1 is a block diagram of a transmitting means used in accordance with this invention.
Fig. 4 is an illustration of thyratron plate and grid voltage wave forms indicating tube conductivity.
Fig. 5 is a graph of the firing, or anode current, of cooperating thyratrons in the receiver circuit.

Referring more particularly to Fig. 1, there is shown an audio oscillator 10 for generating oscillations of audio frequency $f_1$, and an audio oscillator 11 for generating oscillations of audio frequency $f_2$. The audio frequency $f_1$ is coupled to a modulator 12 and also through a phase shifter 13 to a modulator 14. The audio frequency $f_2$ is coupled to the modulator 12 and also passed through a phase shifter 15 to the modulator 14. In this manner, the two audio frequencies $f_1$ and $f_2$ are used to modulate carrier $F_x$ transmitted by a transmitter 16. The two audio frequencies $f_1$ and $f_2$, which are passed through the phase shifters 13 and 15, respectively, produce audio frequencies $f_1'$ and $f_2'$, respectively having phase angles with $f_1$ and $f_2$, respectivel,y that may be controlled in value and sign by manually adjustable controls 17 and 18, respectively. The audio frequencies $f_1'$ and $f_2'$ coupled to the modulator 14 are transmitted by transmitter 19 on carrier $F_y$. For the purpose of illustration let it be assumed that the present invention is used to remotely control an aircraft. The control 17 of the phase shifter 13 will then be considered as controlling the pitch angle and the control 18 will be considered as controlling the azimuth of the aircraft.

Figure 2:
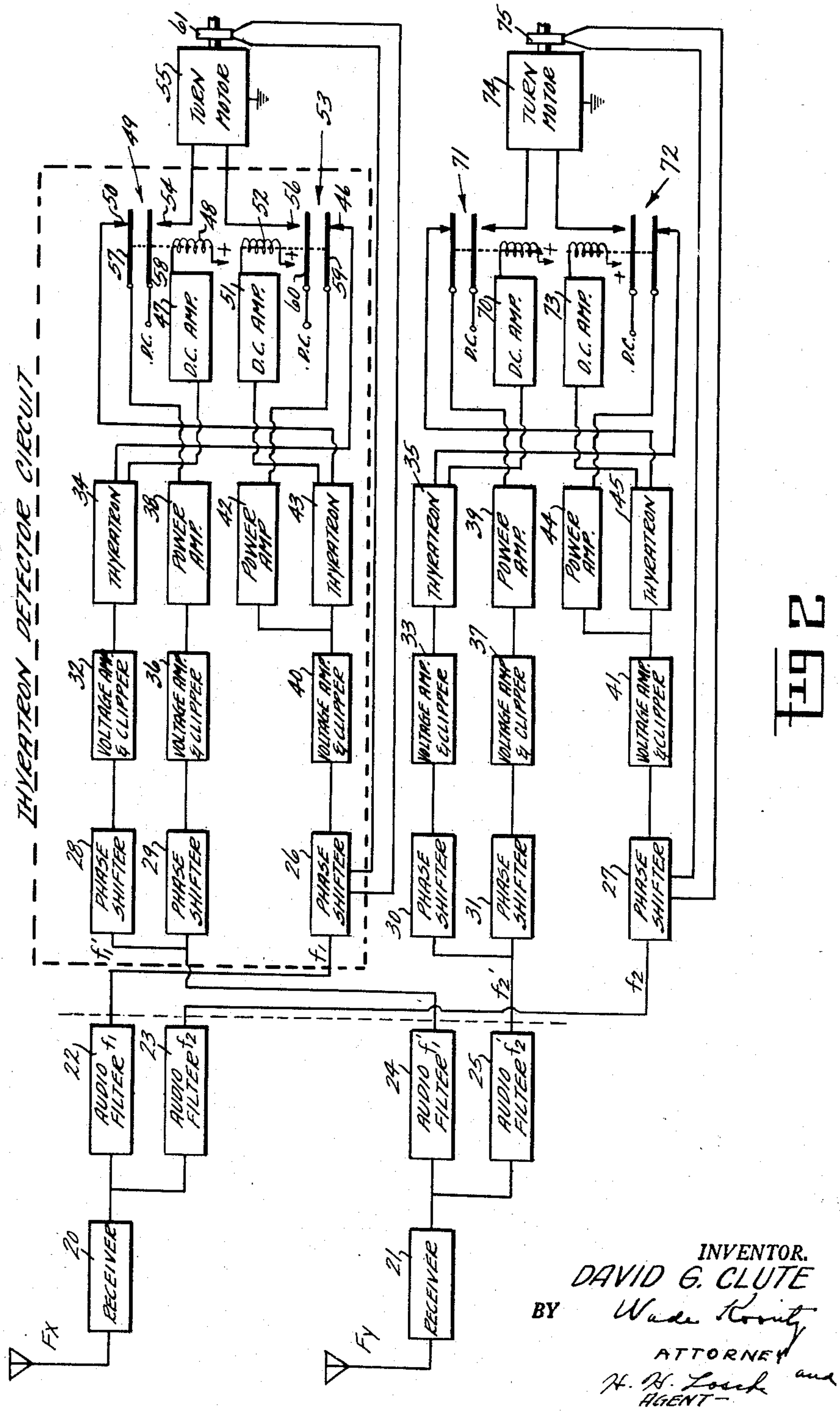
Fig. 2 is a block diagram of a radio receiving means used in accordance with this invention.

Referring now to Fig. 2, there are shown receivers 20 and 21 tuned for receiving $F_x$ and $F_y$, respectively. The output of the receiver 20 is connected to audio filters 22 and 23 for filtering out audio frequencies $f_1$ and $f_2$, respectively, and the output of receiver 21 is connected to audio filters 24 and 25 for filtering out audio frequencies $f_1'$ and $f_2'$, respectively. The frequencies $f_1$ and $f_2$ are connected to phase shifters 26 and 27 in the upper and lower thyratron detector circuits, respectively, and the audio frequencies $f_1'$ and $f_2'$ are connected respectively to phase shifters 28, 29 and 30, 31 in the upper and lower thyratron detector circuits. Corresponding phase shifters 28 and 30 are coupled respectively through voltage amplifier and clippers 32 and 33 to respective thyratrons 34 and 35; corresponding phase shifters 29 and 31 are respectively coupled through voltage amplifier and clippers 36 and 37 to respective power amplifiers 38 and 39; and the corresponding phase shifters 26 and 27 are respectively coupled to voltage amplifier and clippers 40 and 41. The voltage amplifier and clipper 40 is connected to a power amplifier 42 and a thyratron 43; while the voltage amplifier and clipper 41 is connected to a power amplifier 44 and thyratron 45. The output of the thyratron 34 is connected to one contact 46 and through a D. C. amplifier 47 to a coil 48 of a relay switch 49. The output of the thyratron 43 is connected to one contact 50 and through a D. C. amplifier 51 to a coil 52 of a relay switch 53. The relay switch 49 has another contact 54 that is connected to a field winding of a reversible turn motor 55; and the relay switch 53 has another contact 56 connected with a reversing field coil in the turn motor 55. The relay switch 49 has a pair of electrically independent switch arms one arm 57 of which normally rests against contact 50 to connect the power amplifier 38 with the thyratron 43 in its normal position, and the other switch arm 58 of which is normally open from contact 54 and adapted to connect one turn motor field winding to a voltage source. Energization of the coil 48 disconnects 50, 57 and connects 54, 58. Likewise, switch arm 59 of relay switch 53 is normally closed against contact 46 to electrically connect the power amplifier 42 with the thyratron 34. Switch arm 60 is normally open from contact 56 and is adapted to connect the reversing winding of the turn motor 55 to a voltage source. The turn motor 55 controls the pitch control surfaces of the aircraft (not shown) in which the receiving means is installed and also a variable resistance 61 which forms a part of the phase shifter 26.

The lower thyratron detector circuit contains the same elements and is connected in the same manner as just described for the upper thyratron detector circuit. The thyratron 35 is connected through a D. C. amplifier 70 to control a relay switch 71 and is also connected through the normally closed contact of a relay switch 72 to power amplifier 44. The thyratron 45 is connected through a D. C. amplifier 73 to control the relay switch 72 and through the normally closed contact of relay switch 71 to power amplifier 39. The normally open switch blades of the relay switches 71 and 72 are connected to a voltage source and the corresponding cooperative contacts are connected to field coils of a reversible turn motor 74 for operation of the directional control surfaces of the remotely controlled aircraft. A variable resistance 75 is operatively connected to the turn motor 74 shaft and is a part of the phase shifter 27 in the same manner as the variable resistance 61 is in the phase shifter 26 of the upper thyratron detector circuit.

Figure 3:
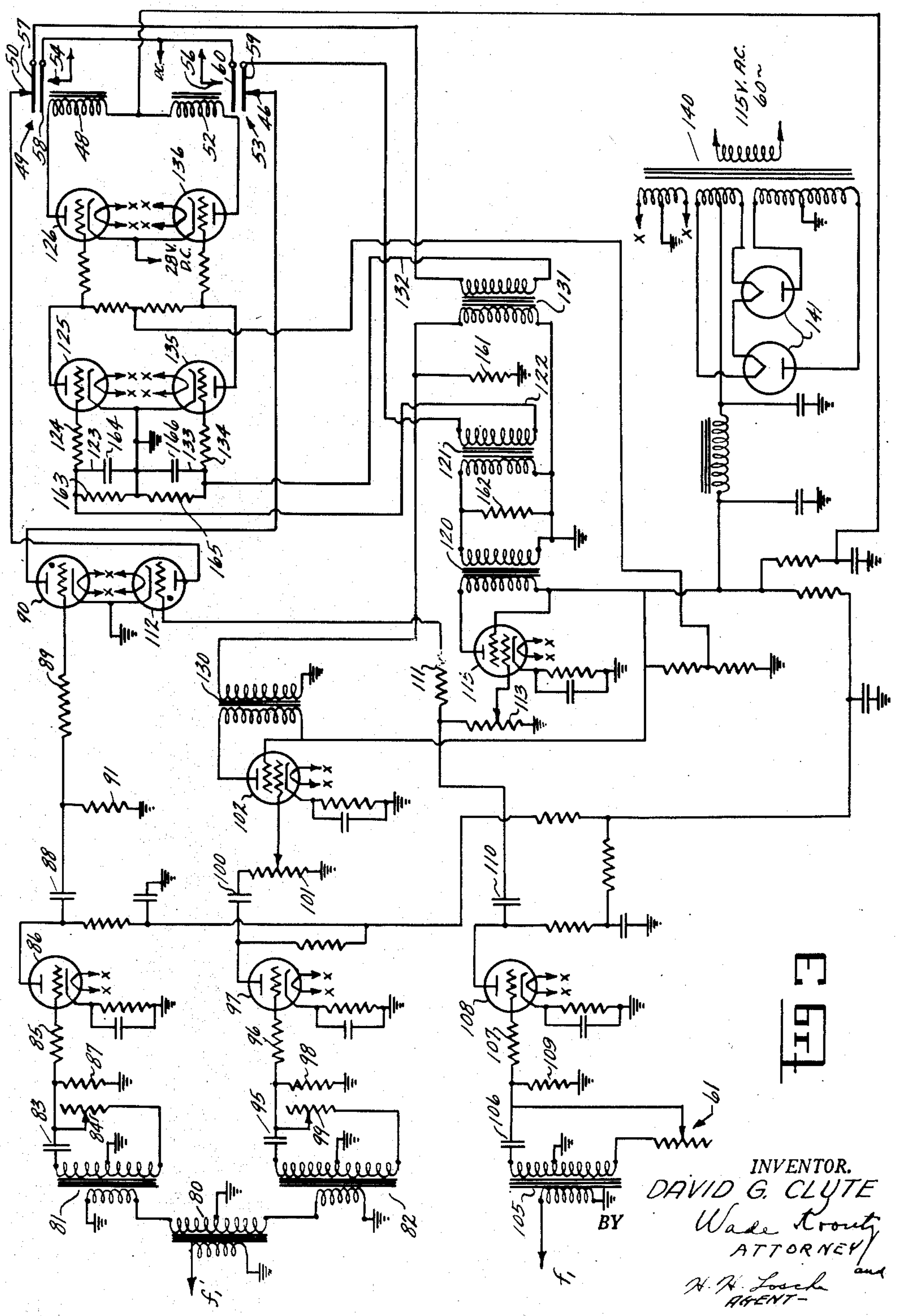
Fig. 3 is a thyratron detector schematic circuit diagram constituting a part of the block diagram of Fig. 2.

In order to more fully understand the invention, the thyratron detector circuit will be described more in detail. This circuit, shown in block diagram in Fig. 2 within the inclosure of broken lines, is shown in schematic circuit diagram in Fig. 3. Since both thyratron circuits are identical, only the upper thyratron detector circuit, in which audio frequencies $f_1$ and $f_1'$ are introduced, will be described.

The voltage output from the audio filter 24 of frequency $f_1'$ is applied to the primary of a transformer 80, the secondary of which is center tapped to ground. One-half of the secondary is coupled to the primary of a transformer 81 and the other half of the secondary is coupled to the primary of a transformer 82. The upper half of the secondary of transformer 81 is connected through a capacitor 83 to a movable contact of a variable resistance 84 (comprising the phase shifter 28) which is connected to the lower half of the secondary of transformer 81. The movable contact of the variable resistance 84 is connected through a high resistance 85 to the grid of a voltage amplifier tube 86, which is preferably one section of a 6SN7GT, and also connected through a grid resistance 87 to ground. The plate of the voltage amplifier tube 86 is serially connected through a condenser 88 and a resistor 89 to the grid of thyratron tube 90, which is preferably an 884 type tube. A grid resistor 91 is tapped between the condenser 88 and the resistor 89 to ground. The circuit just described corresponds for the most part to the circuit through the phase shifter 28, voltage amplifier and clipper 32 and thyratron 34 shown in Fig. 2.

The phase shifter 29 and voltage amplifier and clipper 36 are connected in the same manner as the corresponding elements above in that the upper side of the secondary of transformer 82 is connected in series through a condenser 95 and resistor 96 to the control grid of a voltage amplifier tube 97, also preferred to be one section of 6SN7GT. The grid of this tube is connected to ground through grid resistance 98. The movable contact of a variable resistance 99 is connected at the junction of condenser 95, resistance 96 and resistance 98, the stationary element of which is connected to the lower side of the secondary of transformer 82. The plate of the voltage amplifier 97 is connected through a condenser 100 to a potentiometer 101, the movable contact of which is connected to the control grid of a power amplifier tube 102, which is preferably a 6L6 tube.

The frequency $f_1$ entering the circuit through the phase shifter 26, voltage amplifier and clipper 40, power amplifier 42 and thyratron 43 is coupled through the primary of a transformer 105. The secondary is centrally grounded. The upper side of the secondary is connected serially through a condenser 106 and a high resistance 107 to the grid of a voltage amplifier tube 108, which is preferably a 6J5. The grid of tube 108 is connected to ground through resistance 109 connected between the junction of condenser 106 and resistance 107. The lower side of the secondary of the transformer 105 is connected to the variable resistance 61 which is actuated by the reversible turn motor 55, the other lead of the variable resistance being connected to the junction of the condenser 106 and resistances 107, 109. The plate of the voltage amplifier tube 108 is serially connected through a condenser 110 and a high resistance 111 to the control grid of a thyratron tube 112, preferably an 884 type tube, and also to a potentiometer 113, the variable contact of which is connected to the control grid of a power amplifier tube 115, which preferably is also a 6L6 tube.

The plate of the power amplifier tube 115 is coupled through the transformers 120 and 121 to the plate of the thyratron tube 90 through contact 46 and arm 59 of the relay switch 53. The coil of the transformer 121 in circuit with the plate of the thyratron tube 90 is connected by conductors 122 and 123 through a resistance 124 to the grid of a D. C. amplifier, referred to generally as 47 in Fig. 2, consisting of two stages 125 and 126, the anode of the second stage being coupled to the coil 48 of the relay switch 49 to amplify the signal sufficiently to operate this relay switch.

The plate of the power amplifier tube 102 is coupled through transformers 130 and 131 through contact 50 and arm 57 of relay switch 49 to the plate of the thyratron tube 112. The winding of the transformer 131 connected to the plate of the thyratron tube 112 is connected by conductors 132 and 133 through resistance 134 to the grid of a tube 135 constituting the first stage of a D. C. amplifier, referred to generally as 51 in Fig. 2, the anode of the second stage 136 being coupled to the coil 52 of the relay switch 53 to amplify the signal sufficiently to operate this relay switch.

The primary of a transformer 140 is connected to a source of alternating current, as an A. C. power supply, and a secondary winding is coupled to a rectifier 141, as a full wave rectifier tube commercially recognized as type 80, to supply D. C. voltages to the thyratron detector circuit. A separate secondary winding of the transformer may be used to supply heater current to the various tubes as is well known in the art.

The operational characteristics of thyratron tubes of the type used in this invention may best be understood by reference to Fig. 4. The large amplitude sinusoidal curve 150 represents the plate voltage of the thyratron tube and the lower amplitude sinusoidal curves 151, 152 and 153 represent three different phase angles of the control grid voltages. The dotted line 154 represents the grid potential necessary to prevent firing of the thyratron by the anode voltage represented by curve 150. As may be understood from Fig. 4, the thyratron tube will not fire, or be conductive, when the grid voltage is 180° out of phase with the plate voltage and of greater amplitude than the voltage represented by curve 154, as may be seen by the curve 152, since the grid voltage remains below cut off of the tube. As the angle of lead is increased above 180°, which may be represented by moving the grid voltage curve to the left, and illustrated as a lead angle of 210°, curve 151, the tube will become increasingly conductive as indicated by the double hatched section $C_1$. Therefore, by increasing the grid voltage angle of lead from 180° up to approximately 360°, the period of conductivity of the tube during the positive half cycle of plate voltage becomes increasingly greater.

On the other hand, if the grid voltage lead angle is made less than 180°, as represented by the curve 152 moved to the right to become curve 153 and indicated as a lead angle of 150°, the thyratron tube would fire, or become conductive, at approximately the beginning of the anode positive half cycle and remain conductive for substantially the full positive half cycle. The lead angle may be reduced substantially to zero and the anode current will still be the maximum since for all lead angles from substantially zero to 180° the tube fires very nearly at the beginning of the positive half cycle of anode voltage. The single hatched section $C_2$, and including the double hatched section $C_1$, represents the thyratron tube conductivity for the grid voltage angle of lead of 150° which would be unchanged if the grid voltage angle decreased to substantially zero.

In operation, the transmitting means in Fig. 1 may be in any desirable place, as on the ground or in an aircraft, for controlling a remote mobile vehicle, which for the purpose of illustration is assumed to be an aircraft carrying the receiving means shown in Fig. 2. Let it be further assumed, for the purpose of illustration, that the manual control 17 (Fig. 1) controls the pitch axis and the manual means 18 controls the directional axis of the remotely controlled aircraft as hereinbefore stated. By manipulating the manual means 17 the phase angle between audio frequency $f_1'$ and audio frequency $f_1$ can be changed; and by operating manual control means 18 the phase angle between audio frequency $f_2'$ and audio frequency $f_2$ can be changed. Audio frequencies $f_1$ and $f_2$ modulate the carrier $F_x$ which is transmitted by 16, and in like manner audio frequencies $f_1'$ and $f_2'$ modulate the carrier $F_y$ which is transmitted by 19.

The two carriers $F_x$ and $F_y$ are received by the receivers 20 and 21, respectively, in the remotely controlled aircraft and the audio frequencies $f_1$, $f_2$, $f_1'$ and $f_2'$ are filtered out by the filters 22, 23, 24 and 25, respectively. The audio frequencies $f_1$ and $f_1'$, which are the audio frequencies comprising the pitch axis control information, are fed to one thyratron detector circuit, and the audio frequencies $f_2$ and $f_2'$, comprising the directional axis control information, are fed to the other thyratron detector circuit.

Since the audio frequency $f_1$ or $f_2$ together with the corresponding audio frequency $f_1'$ or $f_2'$ function identically in their respective thyratron detector circuits, it is considered that a full and complete understanding of the invention will be obtained by reference to the pitch axis control involving audio frequencies $f_1$ and $f_1'$. If the voltage of audio frequency $f_1'$ applied to the transformer 80 leads in phase angle with respect to the voltage of audio frequency $f_1$ applied to transformer 105, the voltage applied to the grid of thyratron 90 will be that of $f_1'$ but it will be 180° lagging the $f_1'$ voltage input due to passing through the voltage amplifier 86; and the voltage of audio frequency $f_1$ applied to the plate will be 360° lagging out of phase with its input voltage due to passing through the voltage amplifier 108 and the power amplifier 115, which is the same as being in phase, making the grid voltage lead the plate voltage of the thyratron 90 by more than 180°. This provides a condition illustrated by the curves 150 and 151 in Fig. 4 wherein the thyratron 90 would only fire near the end of its positive anode voltage half cycle. At the same time the voltage of $f_1'$ is applied through voltage amplifier 97, power amplifier 102 and transformer couplings 130, 131 to the plate of thyratron 112 which plate voltage will lag the voltage of the input by 360° due to passing through the tubes 97 and 102, or actually be in phase with the input voltage, the voltage of $f_1$ is applied to the grid of thyratron 112 out of phase with its input by 180°, due to passing through tube 108, making the grid voltage lead the plate voltage by less than 180°. This produces the condition in the thyratron 112 illustrated by the curves 150 and 153 in Fig. 4 wherein the tube fires at substantially the beginning of its positive half cycle of anode voltage producing the maximum plate current. The firing of thyratron 112 energizes the coil 52 of relay switch 53 to break the plate circuit of thyratron 90 and connect the reversing field winding of the turn motor 55 in circuit with the D. C. voltage source causing the turn motor 55 to rotate in a direction in accordance with the setting of the phase shifter 17 on the transmitting means. Rotation of the turn motor 55 shifts the variable resistance 61 in proportion to the setting of the phase shifter 17 until there is zero phase difference between $f_1$ and $f_1'$ which causes thyratron 112 to cease conduction and break the circuit to turn motor 55.

If the phase angle of the voltage of $f_1'$ lags that of $f_1$, the grid voltage will lead the plate voltage of thyratron 112 by an angle greater than 180° making this thyratron only conductive near the end of the positive half cycle of the anode voltage; while the grid voltage leads the plate voltage of thyratron 90 by an angle less than 180° making this tube conductive at maximum plate current. The conductivity of thyratron 90 energizes coil 48 of the relay switch 49 disconnecting the plate circuit of thyratron 112 and places the one field of turn motor 55 in circuit with the D. C. voltage source to cause the turn motor 55 to operate in one direction and to actuate the aircraft control surface in one direction until the variable resistance 61 is shifted to null the phase difference between $f_1$ and $f_1'$ to break the turn motor 55 circuit. In the above described manner of operation of the manual control means 17 on the transmitting means determines the phase angle differences between the voltages of $f_1$ and $f_1'$ to produce control in either angular direction of the control motor 55 to produce either an "up" or "down" pitch angle of the aircraft.

Ordinarily the lead or lag of 5° to 10° of the critical 180° phase angle is necessary before thyratrons are caused to fire. This is illustrated in Fig. 5 where the solid line curve 90' represents the conductivity of thyratron 90 and the broken line curve 112' represents the conductivity of thyratron 112. The loss of the 5° or 10° around the 180° phase angle difference causes a loss of control in this region as shown in Fig. 5. In order to correct this condition, phase shifters 84 and 99 are provided. With $f_1'$ and $f_1$ applied to the detector circuit in phase, $f_1'$ is retarded by 84 until thyratron 90 is on the verge of firing and is advanced by 99 until thyratron 112 is on the verge of firing. With this adjustment, only a slight phase difference between $f_1'$ and $f_1$ is required to cause one or the other of the thyratrons to operate.

Referring again to Fig. 4 it is seen that only those parts of anode and grid waves near the zero points are effective in initiating action of the thyratrons. Consequently, the shape of the wave for the remainder of the cycle is unimportant in this respect and in actual practice these waves have their peaks clipped so that the anode and grid voltages approach square waves. This is accomplished in amplifiers 86 and 97 by placing high resistances 85 and 96 in series with the grid and by biasing the tubes midway between cut off and zero potential. The use of square waves in the power amplifiers permit a maximum variation in the amplitude of the transmitted signals without upsetting the operating characteristics of the thyratrons 90 and 112 and associated D. C. amplifiers 47 and 51.

A square wave will have essentially the same energy content regardless of whether it has been formed by a sinusoidal transmitted signal of high amplitude or one of low amplitude approaching the minimum usable signal. The fact that the energy content remains uncharged permits the maximum amount of power to be delivered by the power amplifiers at all times and permits the lowest possible primary load impedances 161 and 162 with respect to the secondary on thyratron load impedances consisting of the resistance-condenser parallel circuits 163—164 and 165—166. The reason for making the primary impedances as low as possible with respect to the thyratron load impedances is to maintain the voltage wave shape on the anode of respective thyratrons substantially the same for the half of the alternating current cycle when the thyratrons conduct and the half of the cycle when the thyratrons do not conduct. If this is not done, the firing and extinguishing potentials of the thyratrons do not coincide, which introduces play into the system. The maximum impedances which can be used as a thyratron load is dictated by the minimum amount of power for any particular value of voltage which must be supplied to each thyratron to maintain the thyratron conductive after firing as long as the grid voltage is above the grid potential necessary for firing.

Figure 6:
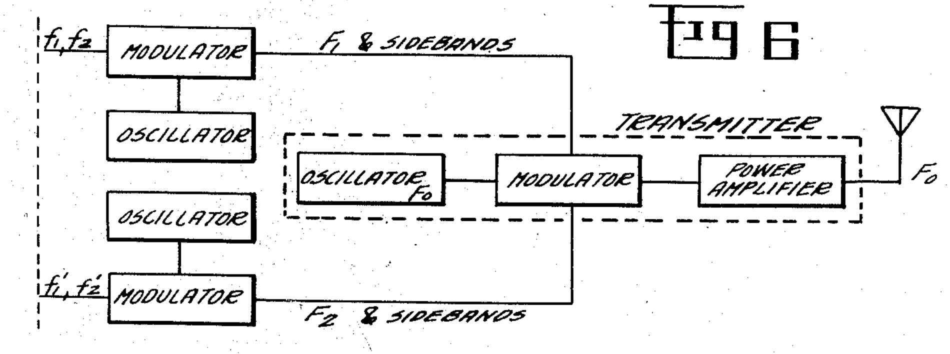
Fig. 6 shows a modification of a part of the transmitting means.
Figure 7:
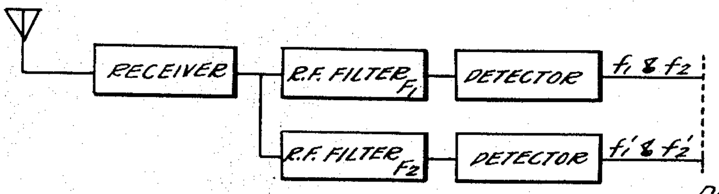
Fig. 7 shows a modification of a part of the radio receiving means used with the modified transmitter means as shown in Fig. 6.

Figs. 6 and 7 show modifications of the transmitting and receiving stations of the control system to permit the use of a single transmitter and receiver. Fig. 6 is to be substituted for the part of the transmitting means to the right of the dotted line in Fig. 1; and Fig. 7 is to be substituted for the part of the receiving means to the left of the dotted lines in Fig. 2. Since the carrier frequency $F_o$ would have to be quite high to permit modulation by the carriers, this arrangement would be limited to use in short range control systems.

While I have described what I believe to be the best embodiments of my invention, it is to be understood that other embodiments and changes may be made without departing from the spirit and scope of my invention and I desire to be limited only in the scope of the appended claims.

I claim:

1. A control information signal transmitting-receiving system for remotely producing mechanical motion comprising; a manually adjustable phase shifter; means passing an audio signal over parallel paths to modulate radio carrier means of a transmitting means, one of said parallel paths including said phase shifter for adjusting the phase relation of the audio signal in this path to lead or lag that of the audio signal in the other path to produce primary and secondary audio frequencies; receiver means for receiving and demodulating said carrier means; means connecting the primary audio frequency signal to the grid of one thyratron tube and the plate of another thyratron tube and means connecting the secondary audio frequency signal to the plate of said one thyratron tube and the grid of said other thyratron tube; and electrically energizable actuatable means connected in each thyratron plate circuit responsive to the rectified output of the respective thyratron tube to produce operation of the corresponding actuatable means upon the respective thyratron tube becoming conductive, said energizable actuatable means associated with said one thyratron tube including switch means operative upon said one thyratron tube becoming conductive to open the plate circuit of said other thyratron tube and said actuatable means associated with said other thyratron tube including switch means operative upon said other thyratron tube becoming conductive to disconnect the plate circuit to said one thyratron tube whereby a lead of the secondary audio signal over said primary audio signal renders said other thyratron tube conductive to effect operation of the corresponding actuatable means opening the plate circuit to said one thyratron tube and a lag of the secondary audio signal with respect to said primary audio signal renders said one thyratron tube conductive to effect operation of the actuatable means connected in its plate circuit opening the plate circuit to said other thyratron tube.

2. A control information transmitting-receiving system as set forth in claim 1 wherein each said switch means has a set of normally open contacts which are adapted to each connect the field coil of a reversible turn motor to a power source such that upon said one thyratron tube becoming conductive the turn motor will be energized to rotate in one direction and upon said other thyratron tube becoming conductive said turn motor will be energized to rotate in the reverse direction to actuate a controlled load.

3. A control information transmitting-receiving system as set forth in claim 2 wherein said turn motor operates a phase shifting means simultaneously with the controlled load, said phase shifting means being connected in said means connecting the secondary audio frequency signal to the plate of said one thyratron tube and the grid of said other thyratron tube whereby any lead or lag produced by said manually adjustable phase shifter, causing the one or the other of said thyratron tubes to become conductive effecting rotation of said turn motor in said one or reversed direction, will operate the phase shifting means by an amount required to bring the secondary audio frequency signal into phase with the primary audio signal rendering the turn motor inoperative.

4. A control information transmitting and receiving system for remotely controlling mobile vehicles comprising transmitting means capable of transmitting two carriers, two audio signals of different frequency modulating one of said carriers, said two audio frequencies also each passing through a manually adjustable phase shifter and applied to said transmitting means for modulating the other carrier, the manual adjustment of each of said phase shifters producing a control information signal, radio receiver means for receiving said two modulated carriers in a remote mobile vehicle, the operating controls of said mobile vehicle being mechanically connected to two reversible electric turn motors, said receiver means adaptable to demodulate said two carriers and filter out the two primary audio frequency signals and the two phase controlled audio signals, one primary audio signal and one phase controlled audio signal of the same frequency each applied to the grid of one thyratron and the anode of the other of a first pair of thyratron tubes, the anode of each thyratron tube having an energizable switch means for breaking the anode circuit of one of the thyratron tubes of said first pair upon conduction of the other of the thyratron tubes in said first pair and the anode of each thyratron tube of the first pair also being electrically associated with one said turn motor, and the other primary audio signal and the other phase controlled audio signal of the same frequency each applied to the grid of one thyratron and the anode of the other of a second pair of thyratron tubes having anode of each of the two other thyratron tubes having an energizable switch means for breaking the anode circuit of one of the thyratron tubes of said second pair upon conduction of the other of the thyratron tubes in said second pair and the anode of each thyratron tube of the second pair also being electrically associated with the other turn motor whereby the lead or lag of the phase controlled audio signals with respect to the corresponding primary audio signals of equal frequency is operative on one or the other of the corresponding pair of thyratrons permitting conduction of only one thyratron tube in each pair to effect operation of the respective turn motor to actuate the corresponding control of the mobile vehicle in a direction corresponding to the lead or lag of the respective audio signal and by an amount proportional to the lead or lag angle.

5. A radio control system for remotely effecting proportional control to an aircraft, or the like, comprising means for modulating one radio carrier by an audio signal frequency and modulating a second carrier by said audio signal frequency after passage through a manually adjustable phase shifter, receivers for receiving and demodulating said radio carriers, the audio signal frequency resulting from demodulation of said one radio carrier constituting a primary audio signal and the audio signal resulting from demodulating said second carrier constituting a secondary audio signal, said primary signal coupled to the grid of a first thyratron tube and also through an amplifier to the anode of a second thyratron tube whereby the grid of said first thyratron tube will operate 180 degrees out of phase with the anode of said second thyratron tube, and said secondary audio signal coupled to the grid of said second thyratron tube and also through an amplifier to the anode of said first thyratron tube whereby the grid of said second thyratron tube operates 180 degrees out of phase with the anode of said first thyratron tube thereby producing a phase angle between the grid and anode of each thyratron tube of 180 degrees plus or minus respectively the lead or lag phase angle between the primary and secondary audio signal frequency, a first relay switch connected in the anode circuit of said first thyratron responsive to the rectified current of said first thyratron and a second relay switch connected in the anode circuit of said second thyratron responsive to rectified current of said second thyratron, each said relay switch having two sets of cooperating contacts, one set being normally closed and the other set being normally open, said normally closed contacts of said first relay switch being in the coupling between the secondary audio signal input and the anode of said second thyratron tube and the normally closed contacts of said second relay switch being in the coupling between the primary audio signal input and the plate of said first thyratron tube for permitting conduction of only one thyratron tube at a time, a reversible electric power motor for operating a guiding control element of an aircraft, or the like, said power motor having a field winding for one direction of rotation connectible through the normally open contacts of said first relay switch to a voltage source and a field winding for the other direction of rotation connectible through the normally open contacts of said second relay switch to said voltage source, and a phase shifting means operatively connected to said power motor and in circuit with the primary signal input and the grid of said second thyratron to reduce the phase angle between the primary and secondary signals upon operation of said power motor whereby an adjustment of said manually adjustable phase shifter producing an angle of voltage lead of said secondary audio signal over said primary audio signal causes the grid voltage to lead the anode voltage in said second thyratron tube by less than 180 degrees allowing this tube to conduct energizing the coil in said second relay switch breaking the anode circuit of said first thyratron tube and connecting the field coil for rotating said power motor in said other direction until said phase shifting means shifts the angular phase relation between said primary audio signal and said secondary audio signal to zero rendering said second thyratron tube non-conductive allowing said second relay switch to return to its normal position, and an adjustment of said manually adjustable phase shifter producing an angle of lag between said secondary audio signal and said primary audio signal causes said first thyratron tube to be conductive disabling said second thyratron tube and causing rotation of said power motor in said one direction until the phase shifting means nullifies the phase angle between said primary and secondary audio signals.

6. A radiant energy system for remotely controlling an aircraft comprising a transmitter for transmitting two radio carriers, one carrier being modulated by first and second primary audio signals of different frequencies, said first primary audio signal being passed through a pitch axis control phase shifter producing a first changeable audio signal to modulate the other carrier and said second primary audio signal being passed through an azimuth axis control phase shifter producing a second changeable audio signal to also modulate said other carrier, receiver means carried by an aircraft to be remotely controlled for demodulating and filtering out said primary, secondary, first changeable and second changeable audio signals, said first primary and first changeable audio signals being coupled to one thyratron detector circuit and said second primary and second changeable audio signals being coupled to another thyratron detector circuit, each thyratron detector circuit including two thyratron tubes coupled in their respective circuit such that one thyratron tube is conductively responsive to lag phase angles and the other thyratron tube is conductively responsive to lead phase angles between the corresponding primary and changeable audio signals, each said one thyratron tube having its output connected through normally closed contacts of a second relay switch actuatable by the output of each said other thyratron tube of the corresponding thyratron detector circuit and each said other thyratron tube having its output connected through normally closed contacts of a first relay switch actuatable by the output of each said one thyratron tube of the corresponding thyratron detector circuit to permit conductivity of only one of the thyratron tubes and the actuation of only one of the relay switches in the corresponding thyratron detector circuits at a time, a pitch axis reversible turn motor operatively connected to the pitch controls of said aircraft, the forwarding field winding of said pitch axis turn motor being connectible through normally open contacts of said first relay switch and the reversing field winding of said pitch axis turn motor being connectible through normally open contacts of said second relay switch in said one thyratron detector circuit to a voltage source upon actuation of the corresponding relay switch, a directional axis turn motor operatively connected to the directional controls of said aircraft, a forwarding field winding of said directional turn motor connectible through normally open contacts of said first relay switch and the reversing field winding connectible through normally open contacts of said second relay switch of said other thyratron detector circuit to a voltage source upon actuation of the corresponding relay switch, and a phase shifting means mechanically connected to each turn motor and electrically coupled to the corresponding thyratron detector circuit to cancel the phase difference of corresponding primary and changeable audio signals upon rotation of the respective turn motor whereby adjustment at the transmitter of said pitch axis control phase shifter to produce a lag of the first changeable audio signal with respect to the first primary audio signal will cause the forwarding field winding to be energized and said pitch axis turn motor to rotate forwardly an amount proportional to the angle of lag to change the pitch of said aircraft in one direction, and adjustment of said pitch axis controlled phase shifter to produce a lead of the first changeable audio signal with respect to the first primary audio signal effects a change in the pitch of said aircraft in the other direction, said azimuth axis control phase shifter being adjustable alone or simultaneously with said pitch axis control phase shifter to impart changes in direction alone or together with changes in pitch of said aircraft.

References Cited in the file of this patent

UNITED STATES PATENTS

| | | |
|---|---|---|
| 1,984,545 | Peterson | Dec. 18, 1934 |
| 2,236,374 | Morrison | Mar. 25, 1941 |
| 2,256,487 | Moseley et al. | Sept. 23, 1941 |
| 2,296,436 | Goddard | Sept. 22, 1942 |
| 2,363,941 | Busignies | Nov. 28, 1944 |

FOREIGN PATENTS

| | | |
|---|---|---|
| 864,801 | France | May 6, 1941 |